United States Patent

[11] 3,625,818

[72] Inventors Gerard Breidenbach
New York;
Richard C. Ross, Armonk, both of N.Y.
[21] Appl. No. 730,202
[22] Filed May 17, 1968
[45] Patented Dec. 7, 1971
[73] Assignee The United States of America as represented by the United States Atomic Energy Commission

[54] FLEXIBLE CORE REACTOR
3 Claims, 4 Drawing Figs.
[52] U.S. Cl. .................................................... 176/40, 176/21
[51] Int. Cl. ..................................................... G21c 1/00
[50] Field of Search........................................... 176/40, 41, 42, 21, 43, 17, 12

[56] References Cited
OTHER REFERENCES

Proceedings of 2nd U.N. International Conference on the Peaceful Uses of Atomic Energy, Geneva, 1958. An article by Jankowski, pps. 747, 748

Proceedings of 3rd U.N. Int. Conf. (as above) 1965. An article by Adamski et al., pp. 307–312

*Primary Examiner*—Reuben Epstein
*Attorney*—Roland A. Anderson

ABSTRACT: An experimental flexible core reactor with segmented fuel and reflector regions for varying height and width of the core. The segments are layered with materials comprising the fuel, cladding, coolant, and structure to simulate during operation the effect on an operating reactor utilizing such materials.

PATENTED DEC 7 1971

3,625,818

INVENTORS.
Gerard Breidenbach
BY Richard C. Ross

ATTORNEY.

FLEXIBLE CORE REACTOR

BACKGROUND OF THE INVENTION

The invention described herein was made in the course of, or under a contract with the United States Atomic Energy Commission.

There is increasing interest in the development of compact reactor designs for portable use, that is, for use in being moved around aboard trailers and other shipping facilities. In the event of natural disasters such as earthquakes or manmade disasters such as the aftermath of a military attack, one of the most important first steps to be taken is to move into the destroyed area with material, food and shelter, and support facilities including electrical power sources to supply the large amounts of electric power required. These power requirements, if supplied by conventional power systems, necessitate a complete logistic system for delivering fuel. In a disaster area, however, one of the problems is the accompanying destruction of transportation facilities so that a power supply not dependent on such a system would be very important.

A nuclear reactor power supply is one such system which is independent of logistics to deliver fuel on a frequent, regular basis. Therefore the development of a compact portable reactor would enhance the ability of society to respond effectively to the disasters mentioned above.

In the development of a reactor of the type mentioned, it is necessary to produce it in such a size and shape that it can be moved by trailer or other shipping facility. Thus there is not only a problem of size, shape, and weight, but also a problem of making most effective use of shielding.

All of these factors are variable which affect in some measure the operation, efficiency and usefulness of such a reactor. Due to the interrelationship of these factors and the complex nature of their affects, it is not possible at present by theoretical considerations alone to produce the best combination of factors for any particular reactor conception.

SUMMARY OF THE INVENTION

The present invention makes it possible to overcome many of the problems associated with the production of a compact, portable nuclear reactor capable of producing relative large amounts of power.

In accordance with this invention there is provided a flexible core reactor in which many of the variables mentioned above may be varied with a minimum of expense, time, and inconvenience thereby making it possible to determine directly the best combination of these factors for a particular set of conditions.

Essentially, the flexible core reactor consists of an assembly of elements which may be added and subtracted in both height and width to simulate the effect of varying core and reflector dimensions. In addition, the core is assembled in such a way that it can be easily rearranged when larger or smaller fuel elements, fuel element spacings, or other modifications are to be investigated. This result is accomplished by duplicating the nuclear effect of the various materials, rather, than for example, using cladding on the fuel elements which would require the complete replacement of the fuel when a size adjustment is made.

It is therefore a principal object of this invention to provide an experimental nuclear reactor capable of convenient and economic changes in dimensions, material and other variables.

Other objects and advantages of this invention will become readily apparent from the following description of a preferred embodiment of this invention given with reference to the accompanying drawing.

DESCRIPTION OF THE PREFERRED EMBODIMENT

Figure 1:
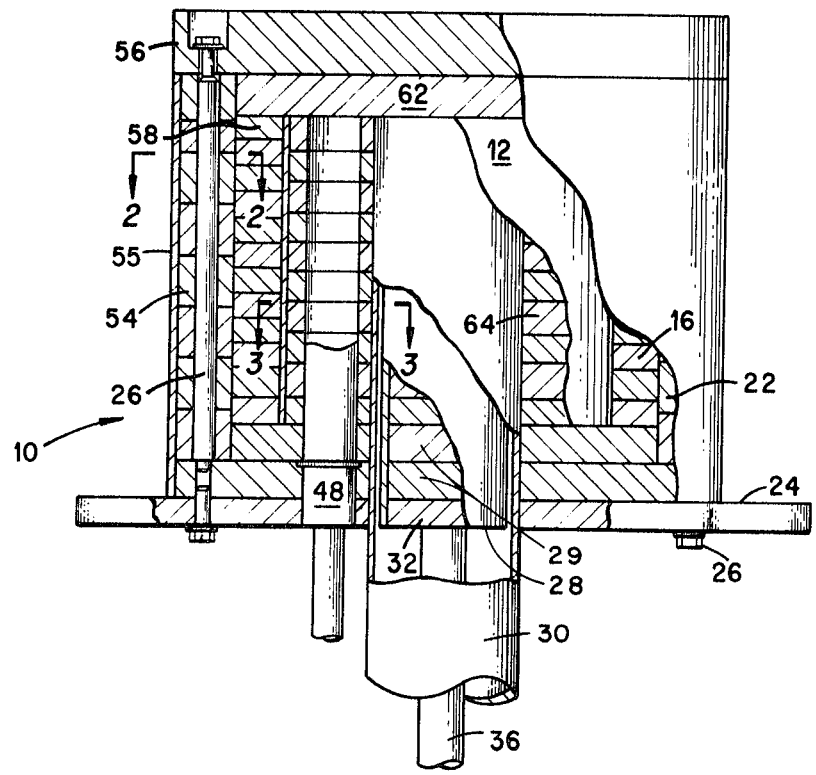
FIG. 1 is a partial section of a preferred embodiment of this invention.

Referring to FIG. 1, there is shown reactor 10 consisting of a cylindrical core 12 surrounded by an annular inner reflector 16 and an outer annular reflector 22. These are supported by a circular plate member 24. A plurality of annularly arranged extended bolts 26 maintain the complete assembly in place. All bolts may be spring loaded to permit axial expansion of the core.

Extending upwardly into reactor 10 and passing through appropriate openings in plate member 24, and terminating within core 12, is a cylindrical fuel plug 28 containing an assembly of disks 29 in a guide tube 30. Fuel plug 28 may be moved in and out of reactor 10 when desired. Disks 29 are made from the same material as are used in the core, supported on a circular plate 32, and moved by means of shaft 36. Plug 28 is a safety device designed so that when it is withdrawn from the reactor, the reactor will remain subcritical when surrounded by a variety of experimental shield configurations.

For the normal control over the operation of reactor 10, there are provided one or more control rods 48 which extend up into core 12 as shown. Adjustment of the position of rod 48 will as understood in the art determine the rate of operation. Control rods 48 are composed of the same materials as are used in the core. One or more of these control rods are used for the rapid shutdown of the reactor in the event of an emergency, and one or more will be used for fine adjustment as described below.

Figure 2:
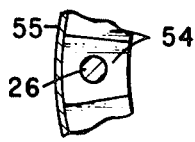
FIGS. 2 and 3 are sections, respectively, taken along 2—2 and 3—3 of FIG. 1.

Outer reflector 22 is constructed from a plurality of stacked segments 54 which as shown in FIG. 2 are wedge shaped and of convenient size to permit convenient handling and assembly. Segments 54 are assembled inside a circular shell 55 and a top plate 56 closes off the top of the assembly.

In a similar fashion inner reflector 16 is constructed from an annular stacked array of segments 58 topped by and held together by a plate 62, while core 12 is constructed of stacked annular segments 64.

Figure 3:
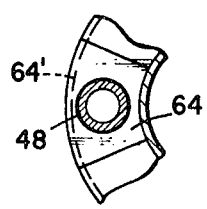

The height and diameter of reactor 10 can be varied in the following fashion. To vary the height, plates 56 and 62 are removed and additional segments 54, 58 and 64 are added, or some taken away, and the plates replaced. To reduce the diameter of core 12, segments 64 are withdrawn and replaced by those of less width, as shown by broken line 64', leaving room for an extra row of reflector segments, as illustrated in FIG. 3. In effect, core diameter has been reduced while inner reflector thickness has been increased. Outer reflector 22 may be increased in diameter by adding an outer row of segments 54 and substituting a larger top plate. It has been found that by the procedure described above, in the particular embodiment, the core can be varied between 13 inches and 15 inches in diameter. The core height can be varied from 13 to 17 inches, with appropriate changes in reflector dimensions. However, physically there is no limit on the range of diameters and heights that can be accommodated.

Figure 4:
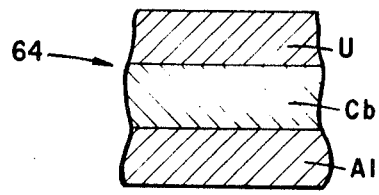
FIG. 4 is a cross section view of a core segment.

One of the principal features of this invention which permits such flexibility is the way in which the fuel and reflector segments are constructed. Referring to FIG. 4, showing a cross section of a fuel segment 64, it will be seen that each segment is composed of layers or laminations of materials that simulate a desired core composition. For example, aluminum, natural uranium, enriched uranium, and columbium-1 percent zirconium are sandwiched together in the proportions which represent materials in the actual core. As reactor 10 operates at a very low level of power when critical, specific provisions for cooling is not required, although a forced air system could be used for extensive periods of operation. The aluminum layer is pierced with holes (not shown) to reduce the effective density of the reactor core. In a similar fashion, the segments making up the inner and outer reflector regions would be layered from suitable materials such as BeO with cladding material for the inner reflector, and steel or tungsten for the outer reflector. The advantage of this type of core and reflector construction is that when, for example, the core height is to be raised or lowered, it is merely necessary to add or subtract segments. If actual elements were used, a complete replacement would be necessary, and the cost would therefore limit the extent to which adjustments in size could be made.

The assembly described above is simple to fabricate and allows a large amount of flexibility for adjustment of both core size and composition. The core is designed so that both gross and fine mass adjustment can be made to compensate for reactivity effects of different shield materials. The gross adjustment is made by the addition or subtraction of segments while fine mass adjustment may be made by movement of the mass adjustment rod. This is one or more of the control rods 48 described above.

By providing an arrangement where changes in dimensions can be accomplished without providing fully prepared and clad fuel elements it is possible to obtain a degree of flexibility and control over parameters not heretofore thought to be possible.

While only a preferred embodiment of the invention has been described it is understood that many variations thereof are possible without department from the principles of this invention.

We claim:

1. A flexible core nuclear reactor comprising:
   a. a supporting plate;
   b. an assembly of stacked fuel segments arranged annularly on said plate;
   c. an assembly of stacked reflector elements fully surrounding said fuel segments;
   d. plates topping off each of said fuel and reflector stacked segments; and
   e. a removable fuel section within said stacked fuel segments; said section being removable through said supporting plate;
   f. said fuel and reflector segments being laminated to duplicate the nuclear effect of materials making up fuel and reflector assemblies.

2. The reactor of claim 1 having means for making a fine mass adjustment of said reactor.

3. The reactor of claim 2 in which the fine mass adjustment means consists of a removable section of fuel which is adjustably withdrawn and reinserted through said supporting plate.

* * * * *